United States Patent
Kogure et al.

(10) Patent No.: US 10,577,141 B2
(45) Date of Patent: Mar. 3, 2020

(54) METHOD FOR FORMING EASILY SEPARABLE PORTION IN PACKAGING FILM, PACKAGE BAG HAVING EASILY SEPARABLE PORTION, AND FILLING-PACKING MACHINE

(71) Applicant: TAISEI LAMICK CO., LTD., Saitama (JP)

(72) Inventors: Hidenori Kogure, Saitama (JP); Shigeomi Abe, Saitama (JP)

(73) Assignee: TAISEI LAMICK CO., LTD., Saitama (JP)

( * ) Notice: Subject to any disclaimer, the term of this patent is extended or adjusted under 35 U.S.C. 154(b) by 308 days.

(21) Appl. No.: 15/508,704

(22) PCT Filed: Aug. 31, 2015

(86) PCT No.: PCT/JP2015/074771
§ 371 (c)(1),
(2) Date: Mar. 3, 2017

(87) PCT Pub. No.: WO2016/039214
PCT Pub. Date: Mar. 17, 2016

(65) Prior Publication Data
US 2017/0253358 A1    Sep. 7, 2017

(30) Foreign Application Priority Data
Sep. 9, 2014 (JP) .................. 2014-183065

(51) Int. Cl.
*B29C 65/00* (2006.01)
*B65B 9/00* (2006.01)
(Continued)

(52) U.S. Cl.
CPC ............ *B65B 51/225* (2013.01); *B29C 65/08* (2013.01); *B29C 65/086* (2013.01); *B29C 65/76* (2013.01);
(Continued)

(58) Field of Classification Search
CPC ....... B29C 65/00; B29C 65/08; B29C 65/086; B29C 65/70; B29C 65/76; B29C 66/00;
(Continued)

(56) References Cited

U.S. PATENT DOCUMENTS

2006/0211559 A1* 9/2006 Howell .................... B65B 9/20
493/394

FOREIGN PATENT DOCUMENTS

JP    51-10438    3/1976
JP    10-95472    4/1998
(Continued)

OTHER PUBLICATIONS

Search Report issued in PCT/JP2015/074771, dated Sep. 29, 2015.
IPRP in PCT/JP2015/074771 with English language translation, dated Mar. 14, 2017.

*Primary Examiner* — Jacob T Minskey
*Assistant Examiner* — Matthew Hoover
(74) *Attorney, Agent, or Firm* — Greenblum & Bernstein, P.L.C.

(57) ABSTRACT

To provide a method for readily forming an easily separable portion having an adhesive strength that is required as a package bag on packaging film, a package bag having an easily separable portion formed by this method, and a filling-packing machine utilizing this method. A method forming an easily separable portion in packaging film by interposing at least two packaging films between a horn emitting ultrasonic waves and an anvil oppositely disposed to the horn, and vibrating the packaging films by the
(Continued)

ultrasonic waves, in which a vibratable layer is provided on the packaging film in at least one of the horn side and the anvil side.

6 Claims, 4 Drawing Sheets

(51) Int. Cl.
| | |
|---|---|
| *B65B 51/00* | (2006.01) |
| *E21D 20/00* | (2006.01) |
| *F16B 13/00* | (2006.01) |
| *B65B 51/22* | (2006.01) |
| *B29C 65/08* | (2006.01) |
| *B65B 51/10* | (2006.01) |
| *B65B 9/20* | (2012.01) |
| *B29C 65/76* | (2006.01) |
| *B65B 51/16* | (2006.01) |
| *E21D 20/02* | (2006.01) |
| *F16B 13/14* | (2006.01) |

(52) U.S. Cl.
CPC ........ *B29C 66/1122* (2013.01); *B29C 66/133* (2013.01); *B29C 66/41* (2013.01); *B29C 66/4322* (2013.01); *B29C 66/71* (2013.01); *B29C 66/73713* (2013.01); *B29C 66/8122* (2013.01); *B29C 66/81264* (2013.01); *B29C 66/83411* (2013.01); *B65B 9/20* (2013.01); *B65B 51/10* (2013.01); *B65B 51/16* (2013.01); *E21D 20/026* (2013.01); *F16B 13/143* (2013.01); *B29C 66/00441* (2013.01); *B29C 66/4312* (2013.01); *B29C 66/7352* (2013.01); *B29C 66/83413* (2013.01); *B29C 66/83513* (2013.01); *B29K 2995/0091* (2013.01)

(58) Field of Classification Search
CPC ....... B29C 66/10; B29C 66/11; B29C 66/112; B29C 66/1122; B29C 66/13; B29C 66/133; B29C 66/40; B29C 66/41; B29C 66/43; B29C 66/432; B29C 66/4322; B29C 66/70; B29C 66/71; B29C 66/73; B29C 66/737; B29C 66/7371; B29C 66/73713; B29C 66/80; B29C 66/81; B29C 66/812; B29C 66/8122; B29C 66/8126; B29C 66/81264; B29C 66/83; B29C 66/834; B29C 66/8341; B29C 66/83411; B65B 9/00; B65B 9/20; B65B 51/00; B65B 51/10; B65B 51/16; B65B 51/20; B65B 51/22; B65B 51/225; E21D 20/00; E21D 20/02; E21D 20/026; F16B 13/00; F16B 13/10; F16B 13/14; F16B 13/143

See application file for complete search history.

(56) References Cited

FOREIGN PATENT DOCUMENTS

| | | | | |
|---|---|---|---|---|
| JP | 11-227796 | 8/1999 | | |
| JP | 2011-63002 | 3/2011 | | |
| JP | 2011063002 A | * | 3/2011 | ........... B29C 65/086 |
| JP | 2014-58338 | 4/2014 | | |
| WO | 2013/002148 | 1/2013 | | |
| WO | WO-2013002148 A1 | * | 1/2013 | ............ B65D 75/40 |

* cited by examiner

METHOD FOR FORMING EASILY SEPARABLE PORTION IN PACKAGING FILM, PACKAGE BAG HAVING EASILY SEPARABLE PORTION, AND FILLING-PACKING MACHINE

TECHNICAL FIELD

This invention relates to a method for forming an easily separable portion in packaging film, a package bag having an easily separable portion formed by this method, and a filling-packing machine.

RELATED ART

Package bags formed by forming soft packaging films into a bag shape, and filling and packing liquid materials, viscous materials, powders, or granular materials such as food and drink, seasonings, medicaments, and cosmetics, or other packed material have been widely used. In order to facilitate taking out packed material from such package bags, Patent Document 1 discloses a package bag provided with an easily separable and openable sealed portion at a pouring port part of the package bag.

Recently, package bags filled with pre-cooked frozen foods, chilled foods, and others that are heat-cooked in microwave ovens together with these bags have been utilized. In such package bags for microwave ovens, in order to suppress expansion and rupture of the package bags due to steam generated from packed material under heat cooking, for example, as described in Patent Document 2, there is disclosed a package bag provided with a weak sealed portion at a back-sealed central portion that is butt-seamed so that the weak sealed portion is openable in accordance with increase in inner pressure in the bag.

As an easily separable portion forming method for such package bags, for example, there is proposed a method of applying plasma radiation processing to a sealant layer surface of packaging film so as to improve wettability, thereby suppressing fusion between packaging film sheets (Patent Document 3), and there is proposed a method of forming an ink coated film layer on a heat sealed surface of packaging film, etc.

PRIOR ART DOCUMENT

Patent Literature

Patent Document 1: JP-A-H11-227796
Patent Document 2: JP-A-H10-95472
Patent Document 3: JP-A-2014-058338

SUMMARY OF THE INVENTION

Task to be Solved by the Invention

However, in the method of Patent Document 3, there are problems that equipment required for plasma radiation is expensive, and variation is caused in the plasma radiation processing; and in the method of forming the ink coated film layer, the packed material might be contaminated with the ink, and this method cannot be used particularly if the packed material is food and drink.

An easily separable portion can be formed, for example, by controlling heat sealing temperature, pressure, time, and others for packaging film; and an easily separable portion provided to a package bag is required to be separable with a small force, but is also required to have an adhesive strength not to allow a packed material to pass through in order to suppress leakage of the packed material before the package bag is used. It is very difficult to form an easily separable portion satisfying such requirements only by controlling heat sealing temperature, pressure, time, and others, and in particular, this becomes further difficult if the packaging film is excellent in low-temperature heat sealing property.

The present invention has an object to provide a method of readily forming an easily separable portion having an adhesive strength that is required as a package bag in packaging films, a package bag having an easily separable portion formed by this method, and a filling-packing machine utilizing the method.

Solution for Task

In studies for realizing the above object, the inventor has discovered that, in a method for forming an easily separable portion in packaging film by interposing at least two packaging films between a horn emitting ultrasonic waves and an anvil oppositely disposed to the horn, and vibrating the packaging films by the ultrasonic waves, it is effective to provide a vibratable layer on the packaging film in at least one of the horn side and the anvil side; and as a result, the inventor has developed the present invention.

The method for forming the easily separable portion in packaging film according to the present invention, the following further constructions are more preferable means.
(1) the vibratable layer is a layer preferentially receiving vibrations caused by the ultrasonic waves emitted from the horn as compared to the packaging film, and
(2) the vibratable layer is formed by any one selected from office paper, heat resistant paper, glass cloth, cardboard, a Teflon (registered trademark) sheet, a polyethylene terephthalate sheet, a veneer sheet and bamboo, or a combination thereof.

The present invention also proposes a package bag having an easily separable portion formed by the above method for forming the easily separable portion.

Furthermore, the present invention proposes a filling-packing machine comprising: vertical sealing means for folding packaging film fed out and traveled in a longitudinal direction at a center thereof in such a manner that adhesive layers or sealant layers oppose each other, and forming vertical sealed portions at side edge portions of the packaging film in the longitudinal direction so as to form the packaging film into a cylindrical shape; and lateral sealing means for subjecting the packaging film to lateral sealing in a direction orthogonal to the longitudinal direction of the packaging film over the full width at intervals in the longitudinal direction of the packaging film while filling a liquid packing material into the packaging film of the cylindrical shape so as to form package bag bodies,
characterized in that the vertical sealing means comprises a horn emitting ultrasonic waves and an anvil oppositely disposed to the horn which are located so as to sandwich the side edge portion of the packaging film therebetween, and further provides a vibratable layer located on at least one of the horn side and the anvil side of the side edge portion.

It is preferable that the vertical sealing means includes means for feeding out the vibratable layer in accordance with a given vertical sealing position.

Advantageous Effects of Invention

In the method for forming the easily separable portion in the packaging film of this invention, it is possible to concentrate vibrations of the ultrasonic waves emitted from the horn on the vibratable layer, thereby decreasing vibrations (friction heat) transferred to the packaging films, and further to form an easily separable portion in the packaging films, because the vibratable layer is provided on the packaging film as adhesion object in at least one of the horn side and the anvil side in an ultrasonic sealing method utilizing the horn that emits ultrasonic waves and adjusts applied pressure and the anvil disposed oppositely to the horn.

The ultrasonic sealing method is a method that generates friction heat between joint surfaces of fusion objects by fine vibrations and applied pressure caused by ultrasonic waves emitted from the horn so as to fuse and join the fusion objects, and this method is wildly used as a joining method of plastic films, metal, etc.

As the vibratable layer, any layer may be used as long as the layer can freely vibrate between the horn and the anvil, and can preferentially receive vibrations caused by ultrasonic waves emitted from the horn as compared to the packaging film; and particularly, if office paper or heat resistant paper is used, it is possible to form the easily separable portion more easily and more inexpensively than a conventional method.

According to the method for forming the easily separable portion of the present invention, it is possible to readily form various easily separable portions, such as easily separable portions provided to openings of small bags of a three-side sealed type, a four-side sealed type, a back lined pillow package bag or a refill pouch, an easily separable portion provided to a pouring path located at a back lined joint portion as described in Japanese Patent Document No. 2013-169991, and an easily separable portion separable by inner pressure inside a package bag when being heated, such as a package bag for a microwave oven. It is possible to manufacture package bag bodies having easily separable portions in sequential operation in combination with a filling-packing machine.

EMBODIMENTS FOR CARRYING OUT THE INVENTION

Figure 1:
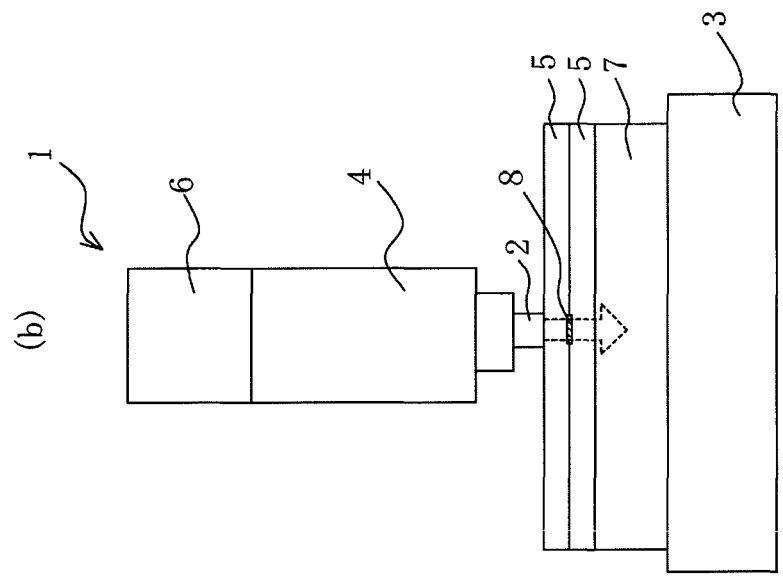
FIG. 1 is an explanatory drawing showing one embodiment of a method for forming an easily separable portion in packaging film of this invention.
Figure 1:
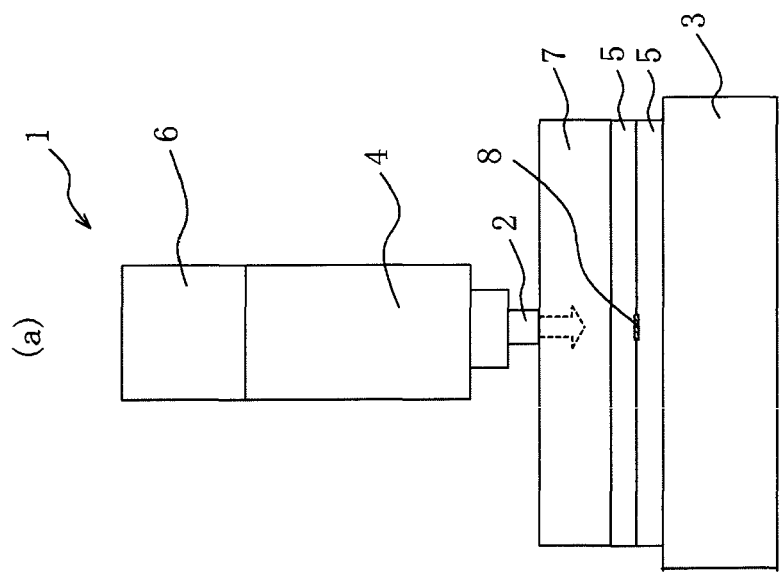

A method for forming an easily separable portion in packaging film of this invention will be described hereinafter with reference to the drawings. An ultrasonic sealing machine 1 in FIG. 1 mainly includes a horn 2 emitting ultrasonic waves generated by an ultrasonic oscillator 4, and an anvil 3 oppositely disposed to this horn 2.

This ultrasonic oscillator 4 includes a pressure cylinder 6 for pressing a front end of the horn 2 that emits ultrasonic waves onto packaging film 5 that is an adhesion object.

When the packaging film 5 is subjected to ultrasonic sealing by using the aforementioned ultrasonic sealing machine 1, two packaging films 5 overlaid with each other are disposed between the horn 2 and the anvil 3, the packaging films 5 are held with pressure between the front end of the horn 2 and the anvil 3, and ultrasonic waves are emitted from the front end of the horn 2 so that the two packaging films 5 are rubbed together and generate heat due to fine vibrations caused by the ultrasonic waves, and heated portions of the packaging films 5 become melted and adhere to each other.

This invention is characterized in that, in the above sealing method using ultrasonic waves, a vibratable layer 7 is provided on the packaging film 5 in at least one of a horn 2 side (FIG. 1(a)) and an anvil 3 side (FIG. 1(b)) as shown in FIG. 1. The vibratable layer 7 is a layer that can freely vibrate due to the ultrasonic waves emitted from the horn 2, and can preferentially concentrate vibrations caused by the ultrasonic waves thereon as compared to the packaging film 5.

In this manner, if the vibratable layer 7 together with the packaging films 5 are provided between the horn 2 and the anvil 3, the vibrations of the ultrasonic waves emitted from the horn 2 are preferentially concentrated particularly to a center in the thickness direction of the vibratable layer 7, as shown by arrows in FIG. 1, and thus amount of ultrasonic vibration transferred to the packaging films 5 decreases. Hence, heat (frictional heat) generated due to vibrations of the ultrasonic waves between the two packaging films 5 becomes extremely smaller compared with the case of interposing no vibratable layer 7; therefore, a adhesion joint strength between the packaging films 5 becomes smaller, and thus an easily separable portion 8 is formed at the portion.

As shown in FIGS. 1(a) and 1(b), even if the vibratable layer 7 is provided on the packaging film 5 in either the horn 2 side or the anvil 3 side, it is possible to exert the effect to preferentially concentrate the vibrations of the ultrasonic waves thereon in the above manner.

Figure 2:
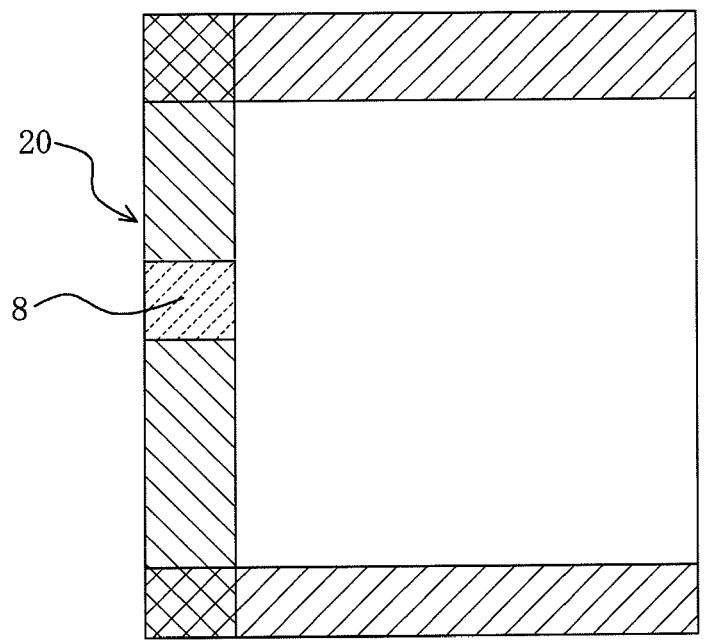
FIG. 2 is a drawing showing one embodiment of a liquid package bag in which an easily separable portion is formed.

In order to form the easily separable portion 8 (e.g., a joint strength of 13N/15 mm or less) at a part of a butt-seamed joint portion 20 of a liquid package bag of a three-side-sealed type as shown in FIG. 2 by the method for forming the easily separable portion in the present invention, for example, both side edges of the packaging film 5 are overlaid with each other, the vibratable layer 7 is provided on at least the side edge portions, and the ultrasonic sealing is carried out by the ultrasonic sealing machine 1, thereby first carrying out an easily separable sealing around a full length of the side edges of the packaging film 5. Subsequently, normal press-heat sealing is carried out at a part other than a given opening position in the easily separable sealed portion, thereby forming the butt-seamed joint portion 20 having high bag breakage strength, and also readily forming the easily separable portion 8 to become the opening at the portion.

The joint strength of the easily separable portion 8 might be different depending on the application, such as one easily separable by being pulled with fingers and one separable by increasing inner pressure of a package bag like a package bag for a microwave oven. The joint strength is preferably set to be not less than 2% but not more than 30% of the joint strength of the sealed portion that defines the package bag. This is because if the joint strength is more than 30%, the bag might not be easily separable by force with fingers or by inner pressure of the bag; and if the joint strength is less than 2%, the bag might be opened by mistake while being transported or stored.

The joint strength of the easily separable portion can be adjusted by selecting a frequency of the ultrasonic waves emitted to or a pressure applied to the packaging film 5 of the ultrasonic sealing machine 1, and also by selecting a type and a thickness of the vibratable layer 7, etc.

The vibratable layer 7 is preferably any one selected from, for example, office paper, heat resistant paper, glass cloth, cardboard, a Teflon (registered trademark) sheet, a polyethylene terephthalate sheet, a veneer sheet and bamboo, or a combination thereof, and in particular, one made from a laminate plural thin layers is preferable because this can flexibly vibrate, and thus vibrations of ultrasonic waves can be easily concentrated.

Since the vibratable layer 7 preferentially concentrates vibrations of the ultrasonic waves emitted from the horn 2 thereon as aforementioned, scorching or melting is likely to be caused, and thus the vibratable layer 7 is required to be appropriately replaced before scorching or melting is caused.

Figure 3:
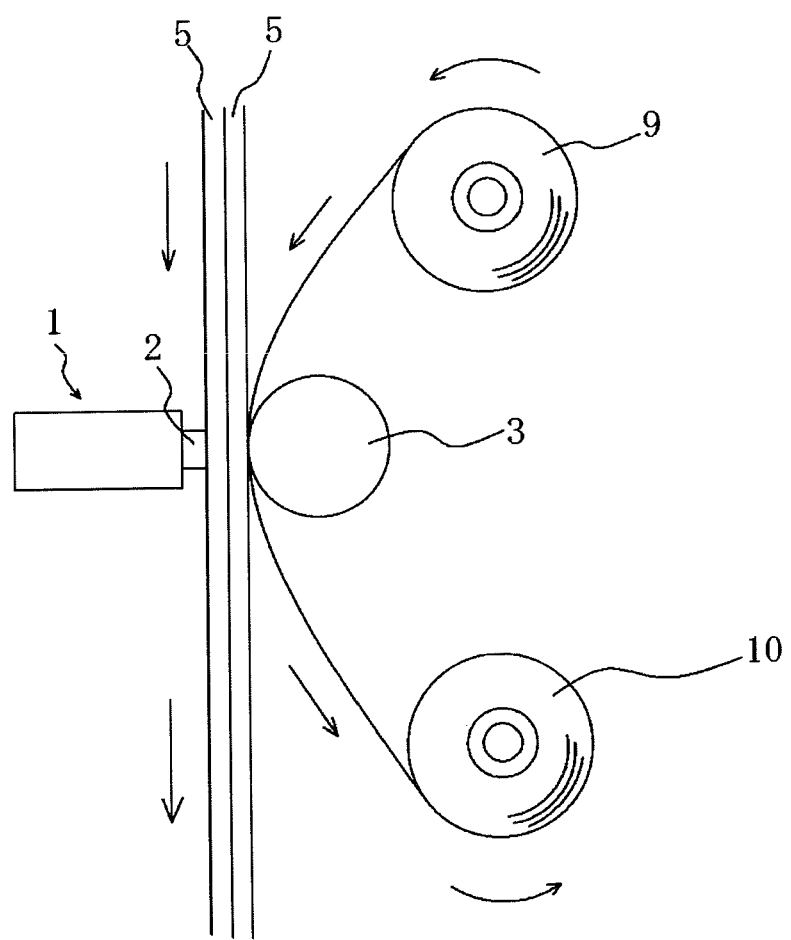
FIG. 3 is a drawing explaining a feed-out method of a vibratable layer for traveling packaging film.

Hence, in the case of forming the easily separable portion in the packaging film 5 travelling through an automated filling machine or the like, for example, as shown in FIG. 3, there is provided feed-out means configured by a feed roll 9 and a wind-up roll 10 of the vibratable layer 7, and the vibratable layer 7 is fed out from the feed roll 9 continuously or intermittently, preferably at a traveling speed equal to or less than the traveling speed of the packaging film 5; after the vibratable layer 7 is overlaid with the packaging film 5, and is subjected to the ultrasonic sealing by the ultrasonic sealing machine 1. The vibratable layer 7 is wound up and collected by the wind-up roll 10. The vibratable layer 7 may be formed in an endless annular shape wound around the feed roll 9 and the wind-up roll 10 so as to be circulated between these rolls.

Figure 4:
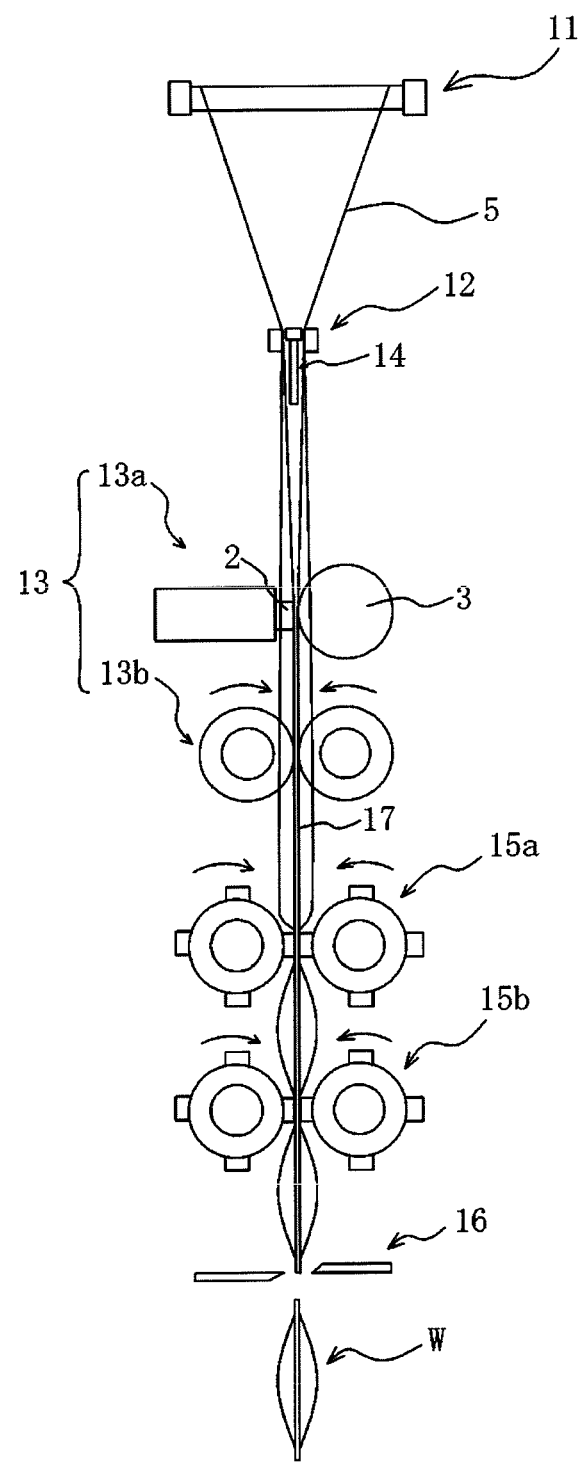
FIG. 4 is a drawing showing a configuration of a vertical filling-packing machine as one embodiment of a filling-packing machine of this invention.

FIG. 4 is a schematic drawing showing a configuration of a vertical filling-packing machine as one embodiment of the filling-packing machine utilizing the aforementioned method for forming the easily separable portion. The filling-packing machine of the present invention is not limited to such a vertical filling-packing machine, but may be applicable to various packing machines, such as a lateral filling-packing machine, a vertical pillow filling-packing machine, a lateral pillow filling-packing machine, a multi-row filling-packing machine.

In the vertical filling-packing machine in FIG. 4, while continuously delivering a single long sheet of packaging film made of laminated film formed by laminating a base film layer formed of a nylon film, a polyethylene terephthalate film, or the like that is biaxially stretched and a sealant layer formed of, for example, various polyethylene resins or the like in the longitudinal direction, the vertical filling-packing machine folds back the packaging film in the width direction thereof such that both side edge portions of the packaging film are overlaid with each other so as to arrange the sealant layers to face each other, continuously forms this packaging film into a number of package bags, and automatically fills a packing material made of a fluid substance, such as food and drink, seasonings, medicaments, cosmetics, or other liquid, viscous, or jelly substances, in each bag. As illustrated, the vertical filling-packing machine mainly comprises: a film guiding section 11; a film folding-back section 12; a vertical-sealed-portion forming section 13; a packing-material supplying section 14; a first lateral-sealed-portion forming section 15a and a second lateral-sealed-portion forming section 15b as a lateral-sealed-portion forming section; and a cutting section 16 cutting a package bag W into each single bag or plural bags. The first lateral-sealed-portion forming section 15a and the second lateral-sealed-portion forming section 15b may be configured by a pair of sealing rolls or sealing plates, or the like.

In such a vertical filling-packing machine, the vertical-sealed-portion forming section 13 includes, for example: an easily-separable-portion forming section 13a that utilizes the ultrasonic sealing method, continuously presses and holds the folded and overlaid both side edge portions of the packaging film 5 between the horn 2 and the anvil 3, and emits ultrasonic waves from the front end of the horn 2; and a normal vertical sealing roll 13b. First, the easily separable sealing is continuously carried out by the easily-separable-portion forming section 13a on the folded and overlaid both side edge portions of the packaging film 5 in the width direction by the film folding-back section 12, and subsequently, the part in the easily separable sealed portion except for the planned forming position of the easily separable portion 8 is heat-sealed by the vertical sealing roll 13b, thereby forming vertical sealed portions 17 having the easily separable portion 8.

At this time, as shown in FIG. 3, the vibratable layer 7 is fed out by the feed roll 9 at a speed in accordance with the traveling speed of the packaging film 5 so that the vibratable layer 7 is overlaid with the both side edge portions of the packaging film 5, thereby suppressing vibrations due to the ultrasonic waves of the packaging film 5 at the position, and thus appropriately decreasing the joint strength of the easily separable portion 8.

Examples

Various materials were used as the vibratable layer, and a sealed state of each easily separable portion was also evaluated at the same time. Results thereof are shown in Table 1. Conditions of packaging film and an ultrasonic sealing machine that were used, and evaluation criteria are as follows.

<Packaging Film>
Biaxially stretched nylon film (15 μm)/linear low-density polyethylene film (40 μm)
<Ultrasonic Sealing Machine>
"ULTRASONIC WELDER SONOPET345D" manufactured by Seidensha Electronic Co., Ltd.
Oscillating frequency: 48.5 kHz
Variable amplitude: 20 to 100%
Sealing width: 1.5 mm
<Evaluation Criteria>
◯: 2 to 10 N/15 mm (easily separable)
Δ: 10 to 13 N/15 mm (separable with a great resistance)
x: inseparable

TABLE 1

| Vibratable layer material | Thickness (per sheet) | Number of layers (layers) | Sealed state of easily separable portion |
|---|---|---|---|
| Office paper | 80 μm | 2 | Δ |
| Office paper | 80 μm | 4 | ◯ |
| Flame retardant paper | 180 μm | 4 | ◯ |
| Glass cloth | 70 μm | 4 | ◯ |
| Teflon sheet | 80 μm | 4 | ◯ |
| Cardboard | 620 μm | 1 | Δ |
| Cardboard | 320 μm | 2 | ◯ |
| Veneer sheet | 5 mm | 1 | Δ |
| Bamboo | 5 mm | 1 | Δ |
| Metallic plate | 100 μm | 2 | X |
| Metallic plate | 100 μm | 4 | X |
| Bakelite | 1 mm | 1 | X |
| Glass epoxy plate | 1 mm | 1 | X |
| MC nylon | 1 mm | 1 | X |

TABLE 1-continued

| Vibratable layer material | Thickness (per sheet) | Number of layers (layers) | Sealed state of easily separable portion |
|---|---|---|---|
| Polyimide | 200 µm | 1 | X |
| PET | 100 µm | 1 | Δ |
| PET/Teflon (registered trademark) | 100/80 µm | 1 | Δ |
| PET/Teflon/PET/Teflon | 100/80/100/80 µm | 1 | ○ |
| PET/PET/Teflon/Teflon | 100/100/80/80 µm | 1 | ○ |
| Office paper/PET | 80/100 µm | 1 | X |
| Office paper/Office paper/PET/PET | 80/80/100/100 µm | 1 | X |
| Office paper/PET/Office paper/PET | 80/100/80/100 µm | 1 | X |

According to the results of Table 1, in the case of using plural overlaid sheets of office paper as the vibratable layer, it was possible to form an easily separable portion that could be separated with fingers without resistance, and easy separability was enhanced more than that in the case of using less sheets of office paper; therefore, it is found that as the number of layers becomes increased, it becomes easier to concentrate the vibrations.

In addition, each of the office paper and PET effectively exerted the effect as the vibratable layer if they were used alone, but the case of combining them into composite layers brought a result that no easily separable portion was formed.

REFERENCE SIGNS LIST 1 ultrasonic sealing machine
2 horn
3 anvil
4 ultrasonic vibrator
5 packaging film
6 pressure cylinder
7 vibratable layer
8 easily separable portion (opening)
9 feed roll
10 wind-up roll
11 film guiding section
12 film folding-back section
13 vertical-sealed-portion forming section
13a easily-separable-portion forming section
13b vertical sealing roll
14 packing-material supplying section
15a first lateral-sealed-portion forming section
15b second lateral-sealed-portion forming section
16 cutting section
17 vertical sealed portion
20 joint portion
W package bag

The invention claimed is:

1. A filling-packing machine comprising:
a vertical sealing means for folding a packaging film fed out and traveled in a longitudinal direction at a center thereof in such a manner that adhesive layers or sealant layers oppose each other and forming vertical sealed portions at side edge portions of the packaging film in the longitudinal direction so as to form the packaging film into a cylindrical shape;
a lateral sealing means for subjecting the packaging film to lateral sealing in a direction orthogonal to the longitudinal direction of the packaging film over the full width at intervals in the longitudinal direction of the packaging film while filling a liquid packing material into the packaging film of the cylindrical shape so as to form package bag bodies,
wherein the vertical sealing means comprises a first sealer and a second sealer, in which the first sealer includes an ultrasonic sealer with a horn emitting ultrasonic waves and an anvil oppositely disposed to the horn, which are located so as to sandwich the side edge portions of the packaging film therebetween, and a vibratable layer located on at least one of the horn side or the anvil side of the side edge portions, which is made from a laminate of plural materials and is arranged to form a vertical separable seal by preferentially receiving the vibrations caused by the ultrasonic waves emitted from the horn as compared to the packaging film, and in which the second sealer comprises a heat sealer configured so that, except for a predetermined separable portion of the vertical separable seal, the vertical separable seal is heat sealed.

2. The filling-packing machine according to claim 1, wherein the vertical sealing means includes means for feeding out the vibratable layer in accordance with a given vertical sealing position.

3. The filling-packing machine according to claim 1, wherein the material of the vibratable layer is any one selected from office paper, heat resistant paper, glass cloth, cardboard, a Teflon sheet, a polyethylene terephthalate sheet, a veneer sheet and bamboo, or a combination thereof.

4. A filling-packing machine comprising:
a vertical sealer for folding a packaging film fed out and traveled in a longitudinal direction at a center thereof in such a manner that adhesive layers or sealant layers oppose each other and forming vertical sealed portions at side edge portions of the packaging film in the longitudinal direction so as to form the packaging film into a cylindrical shape; and
a lateral sealer for subjecting the packaging film to lateral sealing in a direction orthogonal to the longitudinal direction of the packaging film over the full width at intervals in the longitudinal direction of the packaging film while filling a liquid packing material into the packaging film of the cylindrical shape so as to form package bag bodies,
wherein the vertical sealer comprises a first sealer and a second sealer, in which the first sealer includes an ultrasonic sealer with a horn emitting ultrasonic waves and an anvil oppositely disposed to the horn, which are located so as to sandwich the side edge portions of the packaging film therebetween, and a vibratable layer located on at least one of the horn side or the anvil side of the side edge portions, which is made from a laminate of plural materials and is arranged to form a vertical separable seal by preferentially receiving the vibrations caused by the ultrasonic waves emitted from the horn as compared to the packaging film, and in which the second sealer comprises a heat sealer configured so that, except for a predetermined separable portion of the vertical separable seal, the vertical separable seal is heat sealed.

5. The filling-packing machine according to claim 4, wherein the vertical sealer includes a feeder configured to feed out the vibratable layer in accordance with a given vertical sealing position.

6. The filling-packing machine according to claim 4, wherein the material of the vibratable layer is any one selected from office paper, heat resistant paper, glass cloth, cardboard, a Teflon sheet, a polyethylene terephthalate sheet, a veneer sheet and bamboo, or a combination thereof.

\* \* \* \* \*